US012561366B2

(12) United States Patent
Davies et al.

(10) Patent No.: US 12,561,366 B2
(45) Date of Patent: *Feb. 24, 2026

(54) REAL-TIME MICRO-PROFILE GENERATION USING A DYNAMIC TREE STRUCTURE

(71) Applicant: Google LLC, Mountain View, CA (US)

(72) Inventors: Ruxandra Georgiana Davies, Pacific Palisades, CA (US); Scott Tadashi Davies, Pacific Palisades, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,887

(22) Filed: Oct. 17, 2024

(65) Prior Publication Data

US 2025/0036679 A1 Jan. 30, 2025

Related U.S. Application Data

(63) Continuation of application No. 18/009,426, filed as application No. PCT/US2021/040553 on Jul. 6, 2021, now Pat. No. 12,147,471.

(51) Int. Cl.
*G06F 16/90* (2019.01)
*G06F 16/22* (2019.01)
(Continued)

(52) U.S. Cl.
CPC ........ *G06F 16/637* (2019.01); *G06F 16/2246* (2019.01); *G06F 16/9035* (2019.01)

(58) Field of Classification Search
CPC . G06F 16/637; G06F 16/2246; G06F 16/9035
See application file for complete search history.

(56) References Cited

U.S. PATENT DOCUMENTS 8,312,037 B1 11/2012 Bacthavachalu et al.
8,316,019 B1 * 11/2012 Ainslie ............. G06F 16/90324
707/733
(Continued)

FOREIGN PATENT DOCUMENTS

CN 104102699 10/2014

OTHER PUBLICATIONS

India Office Action mailed May 7, 2025 for India Patent Application No. 202227068755, a counterpart foreign application of U.S. Appl. No. 18/009,426, 7 pages.

(Continued)

*Primary Examiner* — Mahesh H Dwivedi
(74) *Attorney, Agent, or Firm* — DORITY & MANNING P.A.

(57) ABSTRACT

Real-time micro-profile generating using a dynamic tree structure is provided. A system receives a first voice query. The system generates, from historical searches related to the first voice query, a first pivot point in a tree structure for the first voice query having child nodes. The system outputs an audio prompt to request selection of one of the child nodes. The system receives, responsive to the audio prompt, a voice input with a selection of a first child node. The system generates, from historical searches related to the first child node, a second pivot point in the tree structure including grandchild nodes. The system determines, based on a resource reduction policy, to generate a checkpoint to reduce additional child node generation. The system builds, based on a response to the checkpoint, a micro-profile for the electronic account identifier with the tree structure.

20 Claims, 5 Drawing Sheets

(51) Int. Cl.
    *G06F 16/635*       (2019.01)
    *G06F 16/9035*    (2019.01)

(56)            References Cited

U.S. PATENT DOCUMENTS

| | | | |
|---|---|---|---|
| 10,241,752 B2 * | 3/2019 | Lemay | G06Q 30/02 |
| 11,899,714 B1 * | 2/2024 | Bueche | G06F 3/16 |
| 2003/0078779 A1 * | 4/2003 | Desai | G06F 3/16 |
| | | | 704/E15.04 |
| 2003/0115289 A1 * | 6/2003 | Chinn | G06F 16/10 |
| | | | 704/E15.044 |
| 2017/0316777 A1 * | 11/2017 | Perez | G06F 40/35 |
| 2018/0261223 A1 * | 9/2018 | Jain | G06Q 30/0601 |
| 2019/0251965 A1 * | 8/2019 | Dharne | G06V 40/174 |
| 2020/0167426 A1 | 5/2020 | Scheidler et al. | |
| 2020/0327895 A1 | 10/2020 | Gruber et al. | |
| 2023/0020613 A1 * | 1/2023 | Drory | H04M 3/5191 |

OTHER PUBLICATIONS

International Preliminary Report on Patentability for PCT/US2021/040553, mailed on Jan. 18, 2024, 10 pages.
International Search Report for PCT/US2021/040553, mailed on Mar. 29, 2022, 4 pages.
Chinese Search Report Corresponding to Application No. 2021800466353 on Nov. 28, 2025.

\* cited by examiner

I Want To Buy My Mother in-Law A Hat
302

Sunhat, Baseball Cap, or Lakers Hat?
304

Lakers Hat
306

REAL-TIME MICRO-PROFILE GENERATION USING A DYNAMIC TREE STRUCTURE

PRIORITY

This application is based upon and claims the right of priority to U.S. Non-provisional patent application Ser. No. 18/009,426, filed Dec. 9, 2022, which is based upon and claims the right of priority under 35 U.S.C. § 371 to International Application No. PCT/US2021/040553, filed on Jul. 6, 2021, which are incorporated by reference in their entirety herein.

BACKGROUND

A computing device can receive a query from a user, process the query, and provide a response to the query. However, due to limited availability or functionality in input or output interfaces of the computing device, it can be challenging to provide useful responses to a query with limited information in a manner that is efficient and without excessive input/output processes via the available interface.

SUMMARY

This disclosure is generally directed to dynamic tree structures. This technical solution can generate a micro-profile in real-time using a dynamic tree structure. For example, in a voice-based computing environment, a computing device executing a digital assistant can receive user input in the form of voice input or audio input. The digital assistant can parse the voice input to identify a query. The digital assistant can attempt to generate a response to the query. However, if the query includes limited or insufficient information, or the user does not have access to sufficient information, then it can be challenging for the digital assistant to generate an accurate or useful response in an efficient manner. For example, the digital assistant may provide a response that may not be useful or may be erroneous. In another example, the user may input numerous or excessive voice queries to identify a desired result. In yet another example, the digital assistant can output a list of candidate responses, which may be cumbersome or excessive for the user to listen to or process. Providing erroneous or incorrect results or responses to a query, or generate a numerous list of candidate responses, can be processor intensive, computationally intensive, utilize extra network bandwidth, or extend the duration of the communication while introducing delays or latencies in the amount of time taken to generate the accurate, desired result to the query.

Systems and methods of this technical solution provide real-time micro-profile generation using dynamic tree structures. This technical solution can receive a general voice query from a user and generate a pivot point. The technical solution can utilize historical search queries executed by a number of computing devices to identify disjointed sets of results. The technical solution can determine a similarity distance between each of the disjointed sets, and then select two or more of the disjointed sets that have the greatest distance between them. The technical solution can then generate an output audio prompt asking the user to select between one of the two items in the pivot point, or ask for something else. The technical solution can continue generating pivot points in this manner and progress through child nodes in a tree structure until identifying a final node.

To reduce the number of input/output requests, this technical solution can generate a checkpoint during the process to ask the user if they are satisfied with the current node, or make a suggestion for a final node for the user to select. In some cases, the checkpoint can entail attempting to resolve the queries without generating additional pivot points and child nodes. With this technical solution, a digital assistant can dynamically or automatically re-group the tree structure and generate one or more child nodes. The technical solution can then generate a micro-profile based on the tree structure that resulted in the selection of the final node. The technical solution can associate the micro-profile with a current context of the queries, such as a time of day, day of week, location, or other contextual information associated with an electronic identifier making the requests. In response to a subsequent new voice query, the digital assistant of this technical solution an determine whether the context matches the context of the previously generated micro-profile and, if so, determine to load the micro-profile in order to leverage the previously dynamically generated tree structure and more efficiently select a response to the query.

At least one aspect is directed to a system for system for dynamic tree structure generation. The system can include a data processing system comprising memory and one or more processors. The data processing system can receive a first voice query detected via a microphone associated with an electronic account identifier. The data processing system can generate, from historical searches related to the first voice query executed by a plurality of computing devices, a first pivot point in a tree structure for the first voice query comprising a plurality of child nodes. The data processing system can output an audio prompt to request selection of one of the plurality of child nodes. The data processing system can receive, responsive to the audio prompt, a voice input comprising a selection of a first child node of the plurality of child nodes. The data processing system can generate, from historical searches related to the first child node, a second pivot point in the tree structure comprising a plurality of grandchild nodes. The data processing system can determine, based on a resource reduction policy, to generate a checkpoint to reduce additional child node generation. The data processing system can build, based on a response to the checkpoint, a micro-profile for the electronic account identifier with the tree structure.

At least one aspect is directed to a method for dynamic tree structure generation. The method be performed by a data processing system comprising memory and one or more processors. The method can include the data processing system receiving a first voice query detected via a microphone associated with an electronic account identifier. The method can include the data processing system generating, from historical searches related to the first voice query executed by a plurality of computing devices, a first pivot point in a tree structure for the first voice query comprising a plurality of child nodes. The method can include the data processing system outputting an audio prompt to request selection of one of the plurality of child nodes. The method can include the data processing system receiving, responsive to the audio prompt, a voice input comprising a selection of a first child node of the plurality of child nodes. The method can include the data processing system generating, from historical searches related to the first child node, a second pivot point in the tree structure comprising a plurality of grandchild nodes. The method can include the data processing system determining, based on a resource reduction policy, to generate a checkpoint to reduce additional child node generation. The method can include the data processing system building, based on a response to the checkpoint, a micro-profile for the electronic account identifier with the tree structure.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
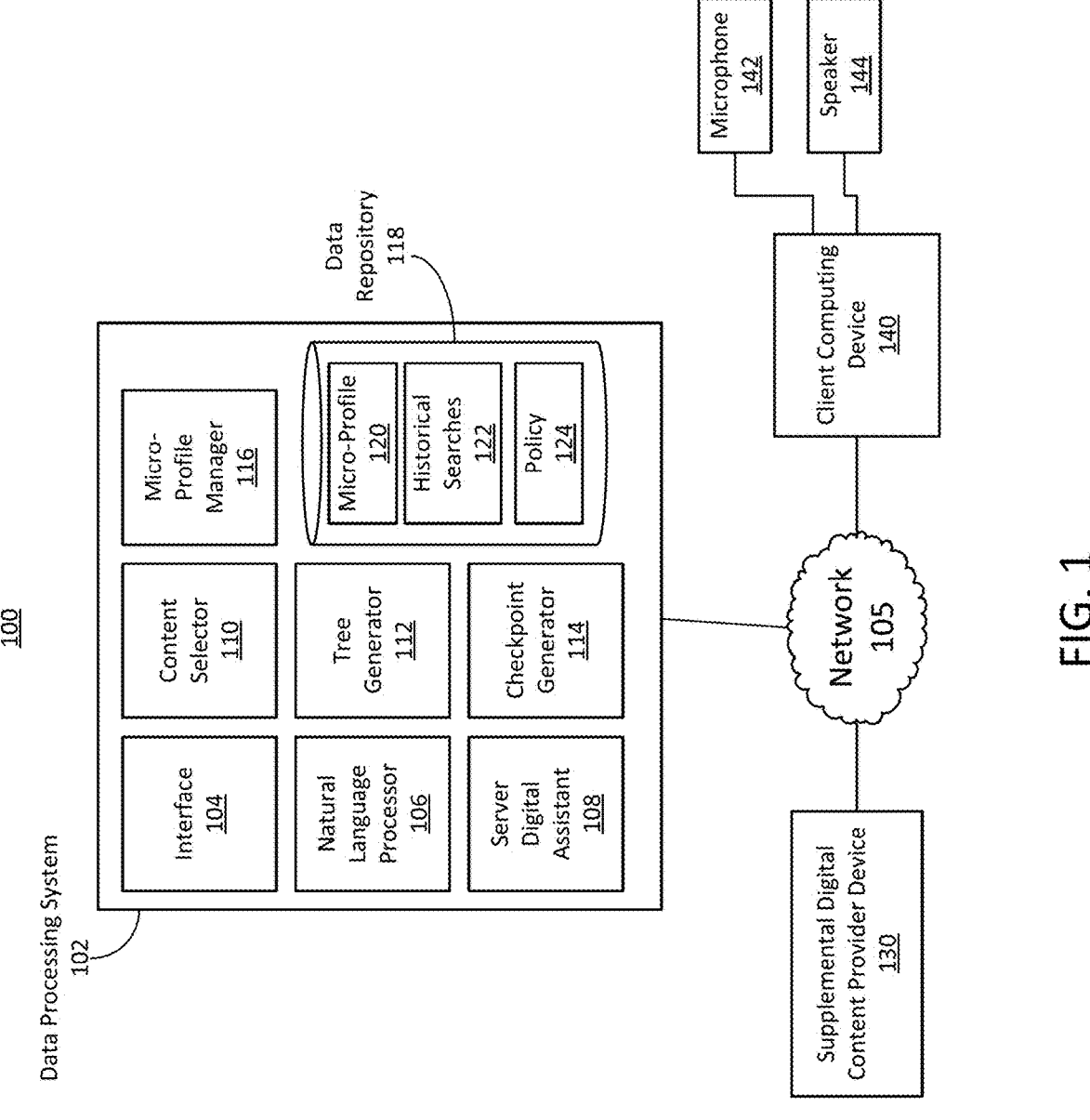
FIG. 1 is an illustration of an example system for dynamic tree structure generation, in accordance with implementations.

Following below are more detailed descriptions of various concepts related to, and implementations of, methods, apparatuses, and systems of dynamic tree structure generation. The various concepts introduced above and discussed in greater detail below may be implemented in any of numerous ways.

This technical solution can generate a micro-profile in real-time using a dynamic tree structure. In a voice-based computing environment, a computing device executing a digital assistant can receive user input in the form of voice input or audio input. For example, a digital assistant device may not include a display device or monitor, or may not include a keyboard or mouse input. In some cases in which the digital assistant device includes a display device and input devices, the user may prefer to operate the digital assistant in a voice-only mode in which the input/output interface is a microphone for voice input, and a speaker for audio output. When using a voice-based interface, the digital assistant can receive an input audio signal with voice input and identify a query. The digital assistant can attempt to generate a response to the query. However, if the query includes limited or insufficient information, or the user does not have access to sufficient information, then it can be challenging for the digital assistant to generate an accurate or useful response in an efficient manner.

For example, using natural language processing, a digital assistant can receive a voice command and output various information, or order products and services. However, the voice query may have to be specific for the digital assistant to provide the correct information or order the right product or service. The voice query may be generic, or the user may not have sufficient information or the ability to generate a specific voice query. For example, a generic and non-specific voice query may be "Why did the operating system on my laptop crash?" Based on this generic query, the data processing system of this technical solution can generate one or more pivot points at one or more levels in a tree structure from disjointed sets of results based on historical search results, and obtain selections from the user for the pivot points until a final node is reached. Upon reaching the final node, the data processing system can identify an action and then execute the action. For example, the action for the final node can be to install an application, re-install the application, or upgrade a version of the application on the computing device that crashed.

Another example of a generic and unspecific voice query may be "Help me find a gift for my mother-in-law." The user may not have anything in mind, and therefore be unable to provide additional information. If the voice query is not sufficiently specific, then the information, product, or service identified by the digital assistant may be incorrect. In some cases, the digital assistant may proceed with order the incorrect product or service, thereby executing a wasted or unwanted transaction that wastes computing resource utilization, network utilization, or battery utilization. In other cases, it may be excessively cumbersome for a digital assistant to narrow down the suggestions, thereby resulting in excessive back and forth between the user and the digital assistant. Without a screen or other display device, the digital assistant may be unable to or not capable of displaying a list of results for the user to scroll through.

Thus, systems and methods of this technical solution can receive a generic voice query, and then generate a pivot point with two suggested results for the voice query and ask the user to select from one of the suggested results, or ask for something else. The technical solution can provide a digital assistant configured to quickly and efficiently narrow down the results in a manner that minimizes or reduces the number of back and forths between the digital assistant and the user, while providing a correct and useful result. For example, in response to the general voice query "Help me find a gift for my mother-in-law", the digital assistant can generate a pivot point query "Are you interested in jewelry, show tickets, or something else?". The pivot point query can be formed of two child nodes: a first child node "jewelry" and a second child node "show tickets." The digital assistant can identify the two child nodes using historic search queries or search results aggregated from multiple computing devices. The digital assistant of this technical solution can select the two child nodes from multiple sets of results having the greatest similarity between them.

The digital assistant can base the clarifying questions and results based on past searches from other users. Overtime, the digital assistant can build a micro-profile based on different contexts. Contexts can be topic based, such as shoe-buying, gift shopping, or movie suggestions. Context can be based on geographic location, time of year (e.g., near holidays). Micro-profile contexts can be more or granular. For example, mother-in-law can be a context for a particular micro-profile generated in real-time using dynamic tree structures. The digital assistant can build the micro-profile using past searches to allow the past searches to influence future searches, allowing the digital assistant to reduce the number of back and forths and narrow the suggestions to a final node efficiently and accurately.

To do so, the digital assistant can receive an original query from the user. The digital assistant can begin generating a tree structure responsive to receiving the original query. The original query can form the top node in the tree structure. The digital assistant can then generate and ask the user a clarifying question to proceed to a child node in the tree structure. The tree can be binary (e.g., the digital assistant can ask "yes" or "no" questions) or more general. The digital assistant can then generate a pivot point. The digital assistant can generate a question to split the universe of possible results into disjointed sets of equal sizes, or substantially equal sizes (e.g., with 1%, 2%, 3%, 4%, 5%, 6%, 10% or other amount that facilitates generating a micro-profile in real-time using dynamic tree structures). The disjointed sets can be far from each other in a distance measure of similarity. Based on the user's response, the digital assistant can proceed to a child node, which can serve as a next pivot point. The digital assistant can repeat the process until the digital assistant reaches a result, or final node.

The digital assistant can periodically and dynamically generate a checkpoint. A checkpoint can refer to presenting a possible final result as an option to the user. For example, a final result can be a specific product or item that may be responsive to the user's original query. This can allow the user to skip the intermediate child nodes and proceed directly to a final node. However, since the digital assistant would be skipping intermediate nodes in suggesting this final result, there is a greater likelihood that the suggest final result may be incorrect. Thus, the digital assistant can use a policy or rule to determine when the tree structure has progressed to an optimal or satisfactory node level to suggest a final result with sufficient likelihood of success or level of confidence. The digital assistant can optimize for different goals, such as helping the user find a result as quickly as possible on average, or avoiding the possibility of a high number of back and forths.

With this technical solution, the child nodes may not be predetermined. The digital assistant can generate open-ended questions, such as "What color shoes are you looking for?". The spectrum of responses is wide, and the digital assistant can proceed with generating the next pivot point or child node based on the response. If the user provides information beyond what the digital assistant asked, the digital assistant can be configured to skip a level in the tree structure, thereby improving efficiency and reducing delay in trec structure or micro-profile generation, thereby allow a user to arrive at a final result as quickly as possible.

To generate the pivot points, the digital assistant of this technical solution can use related searches. The digital assistant can use related searches associated with the electronic account identifier, or other electronic account identifiers having a similar profile. The digital assistant can split the results into groups of approximately the same size with minimal or no overlap. Searches can be deemed related based on various factors, such as time, geographical location, language, etc. The digital assistant can generate child nodes that are equally likely to contain the user's desired end result, even if some are "larger" in the sense of having more final nodes. These probabilities could be based on past queries associated with other electronic account identifiers or, determined using previously built micro-profiles. The digital assistant may use various paths to traverse from an original node to a final node, in which case sets of results grouped under particular nodes may not be completely disjoint.

Once a tree structure has been generated for an electronic account identifier responsive to an original query, the digital assistant can generate a micro-profile based on the interactions associated with the tree structure. The digital assistant can use the micro-profile to improve the efficiency and accuracy of responding to subsequent queries from the electronic account identifier. Which micro-profile the digital assistant uses and alters can depend on the original user query and first few questions. The micro-profiles can cover some context, such as shoe shopping, holiday shopping, movie searches, or shopping for gifts for a particular person (e.g. mother-in-law).

These micro-profiles are different from a general user profile. For example, very similar queries can have very different results due to small changes in context. There might be a particular micro-profile for time of day and/or mood of the user. For example, "I want to watch a movie" could be using a different context for a weekday night (e.g. action movies) vs. Saturday morning (e.g. family movies). Gift shopping would depend on the person for whom the user is shopping. Thus, the digital assistant can build a micro-profile for a particular context, and then load that micro-profile when there is a context match.

The final result can have a large impact on shaping the micro-profile and influencing future results. However, the digital assistant can use each answer along the way to refine the micro-profile. The digital assistant can locally create the micro-profiles for each user session. The digital assistant can store the micro-profile server-side for future use, for use across multiple devices, or erase the micro-profile at the end of the user session. At the end of micro-profile generation, the digital assistant can ask the user if they would like to store the micro-profile for future use. If the micro-profile has already previously been stored and the user agrees, the new enhanced (from the current search) micro-profile can override the previously generated micro-profile having the same context. If the user indicates to not save the micro-profile, then the digital assistant can erase the micro-profile at the end of the current session.

By asking questions to guide the search and using micro-profiles, the digital assistant can effectively help users find answers to open-ended questions and searches. In some cases, the user could terminate the search early, or move to a visual surface to see results corresponding to a node. The digital assistant can integrate this process with third-party applications at the completion of a search in order to execute an action, such as ordering a product or streaming a movie, for example.

The digital assistant, upon identifying final node and an action associated with the final node, can execute the action to make a purchase, for example using linked payment options. The seamless integration can allow the digital assistant to authenticate a selected payment method based on a voice signature or a combination of voice authentication and other biometric or password based security credentials.

FIG. 1 illustrates an example system 100 for dynamic tree structure generation, in accordance with implementations. The system 100 can include content selection infrastructure. The system 100 can include a data processing system 102. The data processing system 102 can communicate with one or more of a client computing device 140, or a supplementary digital content provider device 130 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be provided, output, rendered, or displayed on the client computing device 140.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be provided, output, rendered, or displayed by the client computing device 140. For example, via the network 105 a user of the client computing device 140 can access information or data provided by the supplementary digital content provider device 130.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 140 can include, for example, a laptop, desktop, tablet, digital assistant device, smart phone, mobile telecommunication device, portable computers, smart watch, wearable device, headset, speaker, television, smart display, or automotive unit. For example, via the network 105 a user of the client computing device 140 can access information or data provided by a supplementary digital content provider device 130. In some cases, the client computing device 140 may or may not include a display; for example, the computing device may include limited types of user interfaces, such as a microphone and speaker. In some cases, the primary user interface of the client computing device 140 may be a microphone and speaker, or voice interface. In some cases, the client computing device 140 includes a display device coupled to the client computing device 140, and the primary user interface of the client computing device 140 can leverage the display device.

The client computing device 140 can include a microphone 142. The microphone 142 can include a transducer or other hardware configured to detect sound waves, such as voice input from a user, and convert the sound waves into another format that can be processed by the client computing device 140. For example, the microphone 142 can detect sound waves, and convert the sound waves to analog or digital signals. The client computing device 140, using hardware or software, can convert the analog or digital signals to data packets that correspond to the voice input or other detected audio input. The client computing device 140 can transmit data packets with the voice input to the data processing system 102 for further processing.

The client computing device 140 can include a speaker 144. The speaker 144 can output audio or sound. The speaker 144 can be driven by an audio driver to generate an audio output. The speaker 144 can output speech or other audio generated by the data processing system 102 and provided to the client computing device 140 for output. For example, the user can conduct a conversation with a digital assistant 108 via the microphone 142 and speaker 144 of the client computing device 140.

In some cases, the client computing device 140 can include one or more component or functionality of the data processing system 102, such as the NLP 106, digital assistant 108, interface 104, or data repository 118. For example, the client computing device 140 can include a local digital assistant or digital assistant agent having one or more component or functionality of the server digital assistant 108 or NLP 106. The client computing device 140 can include a data repository that stores a micro-profile. The client computing device 140 can include one or more component or functionality of computing system 500 depicted in FIG. 5.

The system 100 can include at least one data processing system 102. The data processing system 102 can include at least one logic device such as a computing device having a processor to communicate via the network 105, for example with the client computing device 140, or the supplementary digital content provider device 130 (or third-party content provider device, content provider device). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous-one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device, such as a supplementary digital content provider device 130 or a service provider device. The supplemental digital content provider device 130 or other service provider device can include at least one logic device such as a computing device having a processor to communicate via the network 105, for example with the client computing device 140, or the data processing system 102.

The supplementary digital content provider device 130 can provide audio based digital components for display by the client computing device 140 as an audio output digital component. The digital component can be referred to as a sponsored digital component because it is provided by a third-party sponsor. The digital component can include an offer for a good or service, such as a voice based message that states: "Would you like me to order you a taxi?" For example, the supplementary digital content provider device 130 can include memory to store a series of audio digital components that can be provided in response to a voice based query. The supplementary digital content provider device 130 can also provide audio based digital components (or other digital components) to the data processing system 102 where they can be stored in a data repository of the data processing system 102. The data processing system 102 can select the audio digital components and provide (or instruct the supplementary digital content provider device 130 to provide) the audio digital components to the client computing device 140. The audio based digital components can be exclusively audio or can be combined with text, image, or video data.

The data processing system 102 can include a content placement system having at least one computation resource or server. The data processing system 102 can include, interface, or otherwise communicate with at least one interface 104. The data processing system 102 can include, interface, or otherwise communicate with at least one natural language processor 106 (or natural language processor component). The interface 104 or natural language processor 106 can form or be referred to as a server digital assistant 108. The data processing system 102 can include, interface, or otherwise communicate with at least one server digital assistant 108 (or server digital assistant component). The server digital assistant 108 can communicate or interface with one or more voice-based interfaces or various digital assistant devices or surfaces in order to provide data or receive data or perform other functionality. The data processing system 102 can include at least one content selector 110 (or content selector component). The data processing system 102 can include at least one tree generator 112. The data processing system 102 can include at least one checkpoint generator 114. The data processing system 102 can include at least one micro-profile manager 116. The data processing system 102 can include at least one data repository 118. The data repository 118 can store micro-profiles 120 that include keywords and context information associated with a dynamically generated tree structure. The data repository 118 can store historical searches 122 that were executed by other computing devices 140 during a previous time period or interval. The data repository 118 can include policies 124 that can be used to generate a checkpoint to reduce additional resource consumption and node level generation.

The data processing system 102, interface 104, NLP 106, content selector 110, tree generator 112, checkpoint generator 114, and micro-profile manager 116 can each include at least one processing unit or other logic device such as programmable logic array engine, or module configured to communicate with a data repository or database of the data processing system 102. The interface 104, NLP 106, or content selector 110, tree generator 112, checkpoint generator 114, and micro-profile manager 116 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 140 (or computing device or digital assistant device). A user of a client computing device 140 or mobile computing device can affirmatively authorize the data processing system 102 to obtain network activity information corresponding to the client computing device 140 or mobile computing device. For example, the data processing system 102 can prompt the user of the client computing device 140 for consent to obtain one or more types of network activity information. The identity of the user of the client computing device 140 can remain anonymous and the client computing device 140 can be associated with a unique identifier (e.g., a unique identifier for the user or the computing device provided by the data processing system or a user of the computing device). The data processing system 102 can associate each observation with a corresponding unique identifier.

The data processing system 102 can include an interface 104 (or interface component) designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can communicate with one or more of the client computing device 140 or supplementary digital content provider device 130 via network 105.

The data processing system 102 can interface with an application, script or program installed at the client computing device 140, such as an application to communicate input audio signals to the interface 104 of the data processing system 102 and to drive components of the client computing device 140 to render, present or otherwise output visual or audio signals. The data processing system 102 can receive data packets or other signal that includes or identifies an audio input signal.

The data processing system 102 can include a natural language processor ("NLP") 106. For example, the data processing system 102 can execute or run the NLP 106 to parse received input audio signals or queries. For example, the NLP 106 can provide for interactions between a human and a computer. The NLP 106 can be configured with techniques for understanding natural language and allowing the data processing system 102 to derive meaning from human or natural language input. The NLP 106 can include or be configured with technique based on machine learning, such as statistical machine learning. The NLP 106 can utilize decision trees, statistical models, or probabilistic models to parse the input audio signal. The NLP 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP 106 can convert the audio input signal into recognized text by comparing the input signal against a stored, representative set of audio waveforms and choosing the closest matches. The set of audio waveforms can be stored in a data repository or other database accessible to the data processing system 102. The representative waveforms are generated across a large set of users, and then may be augmented with speech samples from the user. After the audio signal is converted into recognized text, the NLP 106 matches the text to words that are associated, for example via training across users or through manual specification, with actions that the data processing system 102 can serve. Aspects or functionality of the NLP 106 can be performed by the data processing system 102 or the client computing device 140. For example, an NLP component can execute on the client computing device 140 to perform aspects of converting the input audio signal to text and transmitting the text via data packets to the data processing system 102 for further natural language processing.

The audio input signal can be detected by a sensor or transducer (e.g., a microphone) of the client computing device 140. Via the transducer, the audio driver, or other components, the client computing device 140 can provide the audio input signal to the data processing system 102 (e.g., via the network 105) where it can be received (e.g., by the interface 104) and provided to the NLP 106 or stored in a data repository.

The data processing system 102 can receive, via the interface 104, data packets comprising an input audio signal detected by a microphone of the client computing device 140. The data processing system 102 can receive data packets that are generated based on an input audio signal detected by the microphone. The data packets can be filtered or unfiltered. The data packets can be a digitized version of the detected input audio signal. The data packets can include text that is generated by the client computing device 140 based on the detected input audio signal. For example, a local digital assistant of the client computing device 140 can process a detected input audio signal and transmit data packets based on the processed input audio signal to the server digital assistant 108 for further processing or to perform an action.

The data processing system 102 can include a server digital assistant 108. The server digital assistant 108 and the NLP 106 can be a single component, or the server digital assistant 108 can include one or more component or functionality of the NLP 106. The server digital assistant 108 can interface with the NLP 106. The data processing system 102 (e.g., server digital assistant 108) can process the data packets to perform an action or otherwise respond to the voice input. In some cases, the data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The NLP 106 can obtain the input audio signal. The NLP 106 of the data processing system 102 can receive the data packets with the voice input or input audio signal responsive to a local digital assistant on the client computing device 140 detecting a trigger keyword. The trigger keyword can be a wakeup signal or hotword that indicates to the client computing device 140 to convert the subsequent audio input into text and transmit the text to data processing system 102 for further processing.

Upon receiving the input audio signal, the NLP 106 can identify at least one query or request or at least one keyword corresponding to the request. The request can indicate intent or subject matter of the input audio signal. The keyword can indicate a type of action likely to be taken. For example, the NLP 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request. In another example, the voice input can include a search query such as "find jobs near me." However, for cases in which the original query may be generic or lack sufficient information to generate an accurate result, the NLP 106 or server digital assistant 108 can forward the original query to a tree generator 112, checkpoint generator 114, or micro-profile manager 116 for further processing.

The NLP 106 can parse the input audio signal to identify, determine, retrieve, or otherwise obtain the request and one or more keywords associated with the request. For instance, the NLP 106 can apply a semantic processing technique to the input audio signal to identify the keyword or the request. The NLP 106 can apply the semantic processing technique to the input audio signal to identify a keyword or phrase that includes one or more keywords, such as a first keyword and a second keyword. For example, the input audio signal can include the sentence "I want to purchase an audiobook." The NLP 106 can apply a semantic processing technique, or other natural language processing technique, to the data packets comprising the sentence to identify keywords or phrases "want to purchase" and "audiobook". The NLP 106 can further identify multiple keywords, such as purchase, and audiobook. For example, the NLP 106 can determine that the phrase includes a first and second keyword.

The NLP 106 can filter the input audio signal to identify the trigger keyword. For example, the data packets carrying the input audio signal can include "It would be great if I could get someone that could help me go to the airport", in which case the NLP 106 can filter out one or more terms as follows: "it", "would", "be", "great", "if", "I", "could", "get", "someone", "that", "could", or "help". By filtering out these terms, the NLP 106 may more accurately and reliably identify the trigger keywords, such as "go to the airport" and determine that this is a request for a taxi or a ride sharing service.

However, and in some cases, the original voice query may be generic or not contain sufficient information. The digital assistant 108 may be unable to determine an accurate result with a high level of confidence. Rather than output a list of candidate results or engage in multiple inefficient back-and-forths with the user, the digital assistant 108 can determine to invoke a tree generator 112. The data processing system 102 can include a tree generator 112 designed, constructed and operational to dynamically generate a tree structure in real-time. The tree generator 112 can receive a first voice query detected via a microphone associated with an electronic account identifier. For example, the tree generator 112 can receive the original voice query or other voice query detected by microphone 142 of the client computing device 140. The client computing device 140 can be associated or linked to an electronic account identifier. An electronic account identifier can refer to or include a username, identifier, or other unique identifier of a user on a network or platform associated with the data processing system 102. The user can login to an operating system or application on the client computing device 140 using the electronic account identifier. The client computing device 140 can provide an indication of the electronic account identifier to the data processing system 102 along with transmission of the voice query, prior to transmission of the voice query, or subsequent to transmission of the voice query. In some cases, the client computing device 140 can establish a communication session with the data processing system 102 using the electronic account identifier for the user.

The tree generator 112 can parse the first voice query or original voice query. The tree generator 112 can identify the query, keywords or semantic information associated with the query. In some cases, the tree generator 112 can leverage one or more component or functionality of the NLP 106 to parse or process the query. For example, the NLP 106 can parse or process the query to identify one or more keywords or semantic meaning, and provide the parsed information to the tree generator 112. In some cases, the tree generator 112 can leverage or use historical searches 122 stored in data repository 118. The tree generator 112 can use the historical searches to generate a pivot point in a tree structure for the first voice query. The pivot point can indicate a plurality of child nodes. In this tree structure, the first voice query or original voice query can form a top node, and the pivot point can provide options or candidate child nodes, from which the user can select a child node for the next level in the tree structure.

The tree generator 112 can identify related searches. The related searches can be stored in historical searches 122. The tree generator 112 can determine related searches using various factors. Searches can be related to the voice query based on geographic location, time or date, language, or electronic account identifier. Searches can be related to the voice query if conducted by other electronic account identifiers having a profile or similar characteristic to the electronic account identifier that provided the original voice query. For example, by inputting the voice query into a search engine the tree generator 112 can identify search results. The tree generator 112 can also obtain search results from related search queries that may be similar to the voice query received from the client computing device 140. The tree generator 112 can identify search results that are more likely to be relevant to the electronic account identifier based on various factors.

The tree generator 112 can split the universe of possible results into disjointed sets of equal sizes, or substantially equal sizes (e.g., with 1%, 2%, 3%, 4%, 5%, 6%, 10% or other amount that facilitates generating a micro-profile in real-time using dynamic tree structures). Sets can be disjointed if they do not contain the same results or results with the same concepts. Sets can be disjointed if they do not have overlap with respect to results or topics. The sets can be substantially disjointed, but may not be completely disjointed. For example, the different sets can contain less than 10% overlap, 8% overlap, 6% overlap, 5% overlap, 3% overlap or other amount of overlap that facilitates real-time generator of a micro-profile using a dynamic tree structure.

The tree generator 112 can identify the different sets and then determine a similarity between the different sets. The tree generator 112 can split the results into groups of approximately the same size with minimal or no overlap. The tree generator 112 can generate child nodes that are equally likely to contain the user's desired end result, even if some are "larger" in the sense of having more final nodes. These probabilities could be based on past queries associated with other electronic account identifiers or, determined using previously built micro-profiles.

The tree generator 112 can use a semantic analysis technique to determine the similarity between the disjointed sets. The tree generator 112 can use a similarity measure to determine or quantify the similarity between disjointed sets. The tree generator 112 can be configured with one more similarity functions. The tree generator 112 can determine a distance metric or an inverse of distance metrics that take on large values for similar objects and either zero or a negative value for dissimilar objects. The tree generator 112 can use a cosine similarity for real-valued vectors. The tree generator 112 can score similarity of the disjointed sets in a vector space model. The tree generator 112 can use a clustering function to determine similarity between the disjointed sets. The tree generator 112 can determine a semantic similarity between the terms in the disjointed sets to determine the distance between the disjointed sets based on their semantic content.

Upon determine a distance between each of the disjointed sets identified using historical searches related to the voice query, the tree generator 112 can identify two disjointed sets that have the greatest distance between them relative to the other disjointed sets. For example, the tree generator 112 can identify two disjointed sets on the opposite ends of the spectrum, or having the least in common.

Using these two disjointed sets, the tree generator 112 can generate a pivot point. The pivot point can include two nodes that correspond to the two disjointed sets separated by the largest distance. The child nodes can be characterized by a term or keyword. The tree generator 112 can generate a clarifying question to ask the user using these two child nodes. The digital assistant can then generate and ask the user a clarifying question to proceed to a child node in the tree structure. The tree can be binary (e.g., the digital assistant can as "yes" or "no" questions) or more general. The digital assistant can then generate a pivot point.

Figure 2:
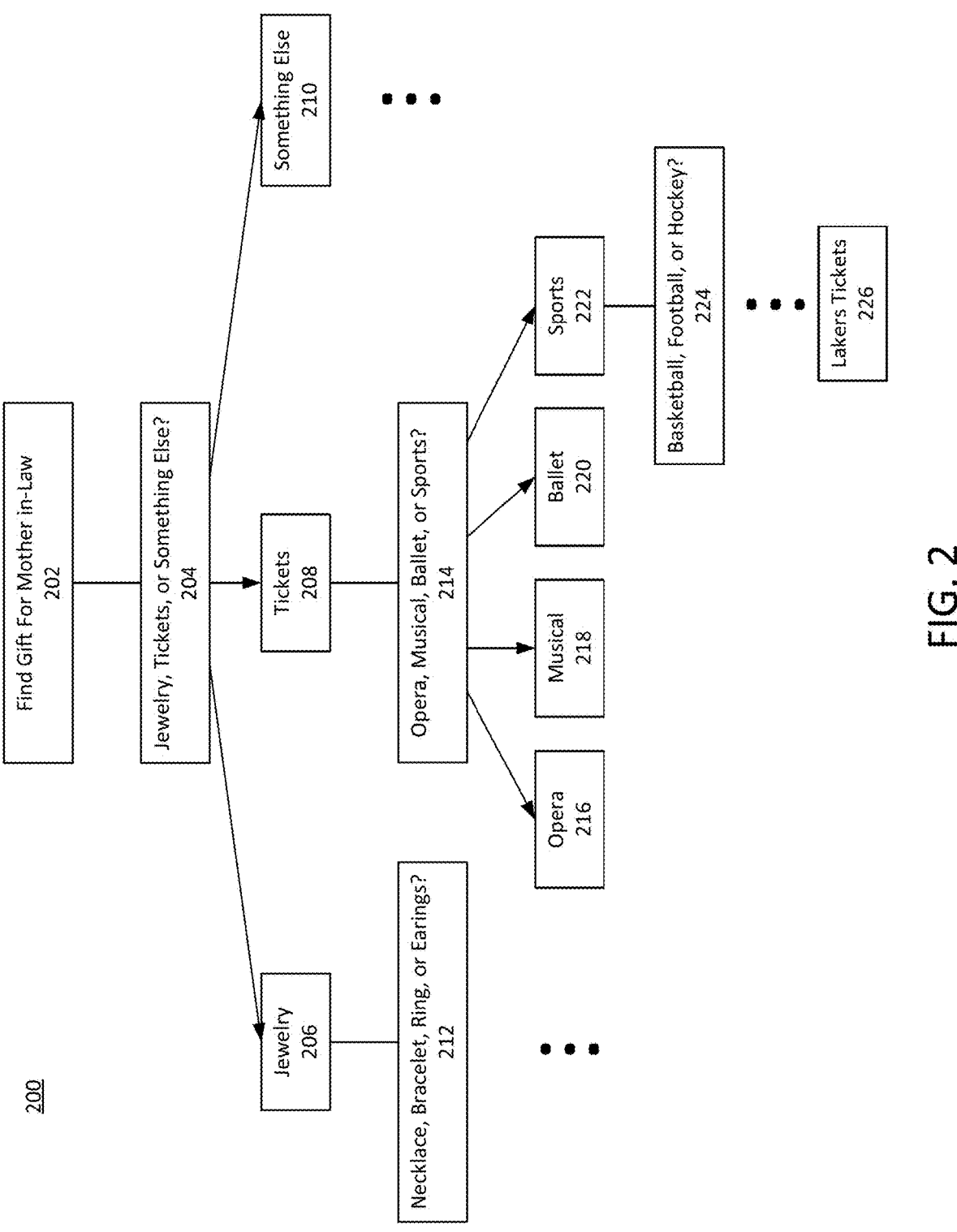
FIG. 2 is an illustration of an example query flow for dynamic tree structure generation, in accordance with implementations.

As illustrated in FIG. 2, the data processing system 102 can receive a query "Find gift for mother in-law". The data processing system 102 can identify two disjointed sets that are separated by the greatest amount of distance as: jewelry and tickets. The data processing system 102 can form a first child node for jewelry and a second child node for tickets. The data processing system 102 can generate the pivot point with the first child node and the second child node. The data processing system 102 can add a third option for "something else" to provide the option to proceed along a third child node that was not provided in the initial list. In some cases, the data processing system 102 can provide three child node options. For example, if there were three disjointed sets that were equally separated from each other with the same distance (or substantially same distance such as within 1%, 2%, 3%, 5%, 6%, etc.), then the data processing system 102 can ask the user to select one of the three child nodes. The data processing system 102 can still include the 4th option for "something else".

If the user responds by selecting "something else", then the data processing system 102 can return to the related searches to identify additional disjointed sets and distances between them to select the next set of child nodes to suggest. The data processing system 102 can repeat this process until the user selects a child node.

Thus, the data processing system 102 can generate the first pivot point with the first child node and a second child node, wherein the first child node and the second child node are separated by a distance greater than a threshold. Threshold can be a relative threshold or dynamic threshold. The threshold can refer to a ranking, such as the greatest distance. The threshold can be an absolute distance threshold or normalized distance threshold. For example, the data processing system 102 can rank the distances between each of the nodes and then select the highest ranking distance or the top two highest ranking distances or top three highest ranking distances. Thus, the data processing system 102 can use the threshold to determine how many child nodes to select to form the pivot point based on the distances. The data processing system 102 can generate the first pivot point with the first child node and a second child node, where a distance between the first child node and the second child node is a greatest distance among a plurality of candidate nodes identified responsive to the first voice query and the first child node and the second child node are formed from separate disjointed sets having sizes within a threshold size (e.g., within 1% in size, 2% in size, 3% in size, 5% in size, 10% in size, or other amount).

The tree generator 112 (e.g., via NLP 106 or digital assistant 108) can generate an audio prompt or provide an indication to generate an audio prompt. The audio prompt can be formed from the selected child nodes. The output prompt can be constructed using a template that includes placeholders for the child nodes and adds on an option for "something else". For example, the output prompt can be "jewelry, tickets, or something else". The data processing system 102 can provide the audio prompt to the client computing device 140 to cause the client computing device 140 to output the audio prompt via the speaker 144.

The data processing system 102 receive, responsive to the audio prompt, a voice input comprising a selection of one of the child nodes. The user can select the first child node or the second child nodes. In some cases, the user may not select one of the suggested child nodes, but may instead indicate "something else", in which case the tree generator 112 can identify another one or more child nodes to suggest to generate a new pivot point. The user can select the child node using voice input detected by the microphone 142. The voice input can be, for example, the name of the child node (e.g., "jewelry") or the voice input can indicate the number or order, such as "the first one" or "the second one". In some cases, the user may ask the data processing system 102 to select one of the first child node or second child node by saying "either one is fine", and the data processing system 102 can select the first one or the second one (e.g., default to selecting the first one, or using a random number generator to select one of the first or second child nodes).

Based on the selected child node, the data processing system 102 can generate a second pivot point. The data processing system can repeat the process to generate the second level child nodes, which can be referred to as grandchild nodes. The data processing system 102 can generate, from historical searches related to the first child node, a second pivot point in the tree structure including grandchild nodes. As depicted in FIG. 2, example grandchild nodes if the selection was the second nodes "tickets" can be "opera", "musical", "ballet" or "sports".

In some cases, the tree generator 112 can determine to select two or more grandchild nodes to generate the second pivot point. The tree generator 112 can determine that since the tree structure has progressed to a more granular or deeper level in the tree (e.g., the second level), that it may be more efficient and accurate to provide additional candidate grandchild nodes. In some cases, the data processing system 102 can determine that there are a greater number of disjointed sets having equal size and equally separated by distance, thereby justifying providing the additional grandchild nodes in a second audio prompt.

The data processing system 102 can construct a second output audio prompt with the grandchild nodes. The second audio prompt can include two or more grandchild nodes. The second audio prompt can include a "something else" option, or may not include the "something else" option depending on the number of grandchild nodes suggested in the second audio prompt. For example, if there are 4 grandchild nodes in the second audio prompt, then the data processing system 102 may forego the something else option. However, if there were 2 grandchild options, then the data processing system 102 can determine to include the something else option.

In some cases, the data processing system 102 can output a second audio prompt to request selection of one of the plurality of grandchild nodes, and determine to skip, based on a response to the second audio prompt, a level in the tree structure to generate a third pivot point with a plurality of great-great-grandchild nodes. For example, the response to the second audio prompt can be "sports tickets for the Lakers", in which case the data processing system 102 can skip a level (e.g., level 224 depicted in FIG. 2) and proceed directly to a great-great-grandchild level 226 with Lakers tickets or a final node, thus generating a dynamic tree structure. When skipping a level, the tree structure can omit or not generate the intermediate level, thus making the tree structure more efficient and dynamic.

The data processing system 102 (e.g., tree generator 112) can proceed with generating pivot points with nodes and receiving selections of nodes until a final node has been identified. The user can provide responses to the audio prompt and the data processing system 102 can continue to narrow down the options for the information, product, or service the user is interested in. However, to reduce computing resource utilization and the duration of the communication session (e.g., to reduce network bandwidth and battery utilization), the data processing system 102 can include a checkpoint generator 114 designed, constructed and operational to generate a checkpoint. The data processing system 102 can invoke the checkpoint generator 114 based on how far in the tree the tree generator 112 has progressed.

The data processing system 102 can determine to invoke the checkpoint generator 114 based on a policy 124, such as a resource reduction policy. The resource reduction policy can be configured with a threshold, such as the number of levels in the tree that have been generated, a duration of the communication session starting with a timestamp associated with receipt of the original voice query, or a measure or metric associated with the child nodes. For example, if the distance between the nodes formed from the results is below a threshold, indicating that there is a large amount of similarity between the nodes, the data processing system 102 can determine to generate a checkpoint. By setting the threshold to be fewer levels in the tree, the data processing system 102 can reduce the amount of bandwidth consumed by repeated back-and-forth requests for information from the user, as well as reduce the amount of processor and memory utilization by reaching a checkpoint and final node at an earlier level in the tree.

A checkpoint can include or refer to selecting a final or more narrow node. The checkpoint can refer to asking the user if they want to continue along the tree. For example, the checkpoint generator 114 can determine, based on how many levels in the tree the user has progressed, to ask the user if they want to continue along the tree or get a final suggestion. The user can indicate to continue along the tree, in which case the data processing system 102 can generate another pivot point with nodes. However, the user indicates a final suggestion, or the checkpoint generator 114 determines to generate a final suggestion, the tree generator 112 can determine to skip one or more levels in the tree and generate a final node with a narrow suggestion, such as "Lakers tickets". The data processing system 102 can determine, based on a resource reduction policy, to generate the checkpoint to reduce additional child node generation associated with generating more pivot points, output audio prompts, and receiving responses. By generating the checkpoint after a certain number of levels (e.g., 3 levels, 4 levels, 5 levels, etc.) in the tree, the data processing system 102 can reduce the amount of bandwidth consumed by repeated back-and-forth requests for information from the user, as well as reduce the amount of processor and memory utilization by reaching a checkpoint and final node at an earlier level in the tree.

The tree generator 112 can receive a response to the checkpoint, which can be to continue along the tree, or an indication to select the suggested final node. If the tree generator 112 receives a selection of the final node, the tree generator 112 can identify, based on the response to the checkpoint, a final node. The data processing system 102 can construct, based on the final node, an action. The data processing system 102 can execute the action on a remote device configured to perform the action indicated in the final node.

For example, the tree generator 112 can forward the final node to the server digital assistant 108. The server digital assistant 108 can receive the final node, and process the final node to identify an action. The server digital assistant 108 can proceed with generating an action data structure based on the action in the final node. The server digital assistant 108 can be configured to execute actions such as accessing information, conducting electronic transactions, purchasing goods, or ordering services. The server digital assistant 108 can have access to one or more accounts associated or linked with the electronic account identifier that can be used to execute an action, such as ordering a ride sharing service, food, or purchasing other goods.

To improve the efficiency of subsequent tree generation and final node selection, the data processing system 102 can generate a micro-profile. For example, if the tree generator 112 receives a selection of the final node, the tree generator 112 can invoke the micro-profile manager 116 to generate or build a micro-profile 120 based on the completion of the tree and successful selection of the final node. The data processing system 102 can include a micro-profile manager 116 designed, constructed and operational to maintain, build, generate or otherwise provide micro-profiles for electronic account identifiers. The micro-profile manager 116 can build or generate a micro-profile using the tree structure generated by the tree generator 112. The micro-profile manager 116 can use information about one or more pivot points and selected child nodes or the final node to generate the micro-profile. The micro-profile can be different from a regular use profile due to a particular context associated with the micro-profile.

The context can associated with semantic information associated with the original query, location information, acoustic characteristic of the user, language, time of day, day of week, season, holiday or any other contextual information associated with the original query. in some cases, the context can include the mood of the user, which can be determined based on an acoustic characteristic associated with the voice input of the user uttering the voice query. The acoustic characteristic can indicate tone based on amplitude, frequency, tone, or other voice characteristics. The data processing system 102 can compare previous voice characteristics of the user to determine a context. The data processing system 102 can identify a context based on a comparison of the user's mood when uttering a similar voice query.

For example, a query for "buy my mother in-law a gift" can have a different final node if the query is uttered proximate to mother's day versus another holiday, such as Christmas. In another example, a query for "I want to watch a movie" can have a different final node if it is uttered on Friday night as compared to Saturday morning. Thus, the micro-profile generator can identify and store the contextual information along with the resulting tree structure in order to generate the micro-profile. The micro-profile can be generated or customized for a particular electronic account identifier and context.

The micro-profile manager 116 can store the micro-profile in a data repository 118, such as in micro-profile data structure 120. The micro-profile manager 116 can limit access to the micro-profile to only a device associated or linked to the electronic account identifier. In some cases, the micro-profile can be stored on a local client computing device 140. The micro-profile may not be stored on the data processing system 102 or other cloud computing environment or server. In some cases, the micro-profile can be shared among one or more client computing devices 140 that are owned or used or authorized for the same user associated with the electronic account identifier. In some cases, the micro-profile can be erased and not stored anywhere after completion of the session. For example, the micro-profile can be used during a communication session established between the client computing device 140 and the data processing system 102, and after a final node is reached and one or more electronic transactions have been completed, the micro-profile manager 116 can ask the user whether they want to store the micro-profile, where they want to store it, or whether to erase it. The micro-profile manager 116 can store, or not store, the micro-profile in accordance with the user's response. Thus, the data processing system 102 can erase the micro-profile responsive to termination of the communication session (e.g., completing the transaction, a timeout of the session based on an idle timeout value, user logging out of the application or computing device, the computing device going into a standby mode).

The data processing system 102 can load a previously generated micro-profile responsive to receiving a first voice query that forms a top node in the tree structure. For example, responsive to receipt of the first voice query, the data processing system 102 can determine whether the micro-profile exists for the electronic account identifier. The data processing system 102 can identify a context associated with the current receipt of the first voice query, and then perform a lookup in the micro-profile data structure 120 using the electronic account identifier and the contextual information. The contextual information can include, for example, concepts or topics associated with the first query, such as time of day, time of year, season, holiday, shoe-buying, gift shopping, movie watching, geographic location, language, etc. In some cases, the context can include the mood of the user, which can be determined based on an acoustic characteristic associated with the voice input of the user uttering the voice query. The acoustic characteristic can indicate tone based on amplitude, frequency, tone, or other voice characteristics. The data processing system 102 can compare previous voice characteristics of the user to determine a context. The data processing system 102 can identify a context based on a comparison of the user's mood when uttering a similar voice query. If the data processing system 102 identifies a micro-profile for the electronic account identifier with a similar context, the data processing system 102 can load the micro-profile.

The tree generator 112 can load the micro-profile and leverage the micro-profile to generate pivot points. The tree generator 112 can use the micro-profile as well as related search results to generate pivot points. For example, the tree generator 112 can weight certain nodes in a pivot points more heavily based on the micro-profile in order to select those nodes for the pivot point. In another example, the tree generator 112 can skip one or more levels in the tree based on previous node selections or interactions stored in the micro-profile. For example, if the user selects the same genre of movies on Friday nights to watch responsive to a query "show me movies", then the data processing system 102 can skip to that genre of movies and provide options within the genre, thereby improving the efficiency while reducing the number of back-and-forths with the user.

Thus, responsive to receiving a first query, the data processing system 102 can determine whether micro-profiles exist for the user, and whether a micro-profile with a similar context exists. If a matching micro-profile exists, the data processing system 102 can load the micro-profile. Otherwise, the data processing system 102 can proceed with generating a new, dynamic tree structure.

For example, the data processing system 102 can receive a third voice query and determine a current context associated with the electronic account identifier. The data processing system 102 can determine the current context matches the context. The data processing system 102 can load, responsive to the determination that the current context matches the context, the micro-profile to generate a second audio prompt responsive to the third voice query.

In some cases, the data processing system 102 can determine an update to the micro-profile. The data processing system 102 can load the micro-profile, but the user may select different child nodes or a different final node. The data processing system 102 can update the micro-profile based on the different interactions in the new instance, thereby tuning or continually improving the micro-profile for a particular context.

Upon identifying a final node, the server digital assistant 108 can perform an action associated with the final node. For example, using natural language processing, a digital assistant can receive a voice command and output various information, or order products and services, or install an application or perform another action on a computing device. For example, the original voice query may be "Why did the operating system on my laptop crash?" Based on this generic query, the data processing system 102 of this technical solution can generate one or more pivot points at one or more levels in a tree structure from disjointed sets of results based on historical search results, and obtain selections from the user for the pivot points until a final node is reached. Upon reaching the final node, the data processing system 102 can identify an action and then execute the action on the computing device 140. For example, the action for the final node can be to install an application, re-install the application, or upgrade a version of the application on the computing device 140 (e.g., the user's laptop) that crashed. Thus, the data processing system 102 can identify, based on the response to the checkpoint, a final node. The data processing system 102 construct, based on the final node, an action to install an application on a computing device 140 associated with the electronic account identifier. And the data processing system 102 can execute the action on the computing device 140 to install the application.

In some cases, the server digital assistant 108 can determine to provide a supplemental digital content item in addition to performing the action. The server digital assistant 108 can transmit a request for content to the content selector 110 based on the input audio signal. The server digital assistant 108 can transmit a request for supplementary or sponsored content from a third-party content provider. The content selector 110 can perform a content selection process to select a supplementary content item or sponsored content item based on the action in the voice query. The content item can be a sponsored or supplementary digital component object. The content item can be provided by a third-party content provider, such as a supplementary digital content provider device 130. The supplementary content item can include an advertisement for goods or services. The content selector 110 can use the content selection criteria to select a content item responsive to receiving a request for content from the server digital assistant 108.

The server digital assistant 108 can receive a supplementary or sponsored content item from the content selector 110. The server digital assistant 108 can receive the content item responsive to the request. The server digital assistant 108 can receive the content item from the content selector 110, and present the content item, via audio output or visual output. The server digital assistant 108 can provide the content item for presentation via the client computing device 140.

The data processing system 102 can include a content selector 110 designed, constructed, or operational to select supplementary content items (or sponsored content items or digital component objects). To select sponsored content item or digital components, the content selector 110 can use the generated content selection criteria to select a matching sponsored content item based on a broad match, exact match, or phrase match. For example, the content selector 110 can analyze, parse, or otherwise process subject matter of candidate sponsored content items to determine whether the subject matter of the candidate sponsored content items correspond to the subject matter of the keywords or phrases of the content selection criteria (e.g., an action or intent). The content selector 110 can identify, analyze, or recognize voice, audio, terms, characters, text, symbols, or images of the candidate digital components using an image processing technique, character recognition technique, natural language processing technique, or database lookup. The candidate sponsored content items can include metadata indicative of the subject matter of the candidate digital components, in which case the content selector 110 may process the metadata to determine whether the subject matter of the candidate digital component corresponds to the input audio signal. The content campaign provided by the supplementary digital content provider device 130 can include content selection criteria that the data processing system 102 can match to criteria indicated in the second profile layer or the first profile layer.

Supplementary digital content providers may provide additional indicators when setting up a content campaign that includes digital components. The supplementary digital content provider device 130 may provide information at the content campaign or content group level that the content selector 110 may identify by performing a lookup using information about the candidate digital component. For example, the candidate digital component may include a unique identifier, which may map to a content group, content campaign, or content provider.

Responsive to the request, content selector 110 can select a digital component object associated with the supplementary digital content provider device 130. The supplementary digital content can be provided by a supplementary digital content provider device different from a service provider device (e.g., a provider of a ride sharing service). The supplementary digital content can correspond to a type of service different from a type of service of the action data structure (e.g., taxi service versus food delivery service). The client computing device 140 can interact with the supplementary digital content. The client computing device 140 can receive an audio response to the digital component. The client computing device 140 can receive an indication to select a hyperlink or other button associated with the digital component object that causes or allows the client computing device 140 to identify the supplementary digital content provider device 130, request a service from the supplementary digital content provider device 130, instruct the supplementary digital content provider device 130 to perform a service, transmit information to the supplementary digital content provider device 130 or service provider device, or otherwise query the supplementary digital content provider device 130.

A supplementary digital content provider device 130 can establish an electronic content campaign. An electronic content campaign can refer to one or more content groups that correspond to a common theme. A content campaign can include a hierarchical data structure that includes content groups, digital component data objects, and content selection criteria provided by the content provider. Content selection criteria provided by the content provider device 130 can include a type of content, such as a digital assistant content type, search content type, streaming video content type, streamlining audio content type, or a contextual content type. To create a content campaign, supplementary digital content provider device 130 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or supplementary digital content provider device 130), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the client computing device 140. In some cases, an impression can refer to a viewable or audible impression; e.g., the digital component object is at least partially (e.g., 20%, 30%, 30%, 40%, 50%, 60%, 70%, or more) viewable on a display device of the client computing device 140, or audible via a speaker of the client computing device 140. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The supplementary digital content provider device 130 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the supplementary digital content provider device 130 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The supplementary digital content provider device 130 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The supplementary digital content provider device 130 can provide one or more keywords to be used by the data processing system 102 to select a digital component object provided by the supplementary digital content provider device 130. The supplementary digital content provider device 130 can identify one or more keywords to bid on, and further provide bid amounts for various keywords. The supplementary digital content provider device 130 can provide additional content selection criteria to be used by the data processing system 102 to select digital component objects. Multiple supplementary digital content provider devices 130 can bid on the same or different keywords, and the data processing system 102 can run a content selection process or ad auction responsive to receiving an indication of a keyword of an electronic message.

The supplementary digital content provider device 130 can provide one or more digital component objects for selection by the data processing system 102. The data processing system 102 (e.g., via content selector 110) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, digital component link, or an assistant application component. A digital component object (or digital component, supplementary content item, or sponsored content item) can include, for example, a content item, an online document, audio, images, video, multimedia content, sponsored content, or an assistant application. Upon selecting a digital component, the data processing system 102 can transmit the digital component object for rendering on the client computing device 140, or display device thereof. Rendering can include displaying the digital component on a display device, executing an application such as a chatbot or conversational bot, or playing the digital component via a speaker of the client computing device 140. The data processing system 102 can provide instructions to a client computing device 140 to render the digital component object. The data processing system 102 can instruct the client computing device 140 to generate audio signals or acoustic waves.

The content selector 110 can, responsive to a request, perform a real-time content selection process. Real-time content selection can refer to or include performing the content selection responsive to a request. Real-time can refer to or include selecting the content within 0.2 seconds, 0.3 seconds, 0.4 seconds, 0.5, 0.6 seconds, or 1 second of receiving the request. Real-time can refer to selecting the content responsive to receiving the input audio signal from client computing device 140.

The content selector 110 can identify multiple candidate supplementary content items. The content selector 110 can determine a score or rank for each of the multiple candidate supplementary content items in order to select a highest ranking supplementary content item to provide to the client computing device 140.

FIG. 2 is an illustration of an example query flow for dynamic tree structure generation, in accordance with implementations. The flow 200 can be performed by one or more system or component depicted in FIG. 1, including, for example, a data processing system. The data processing system can receive an original or first query 202 such as "find gift for mother in-law". The data processing system can process the original query and generate a pivot point 204 with two or more child nodes selected from disjointed sets being different from one another. The pivot point 204 can be "jewelry, tickets, or something else". The pivot point 204 can be formed from child node jewelry 206, child node tickets 208, and something else node 210 that allows the user to receive a different set of child nodes.

The data processing system can receive a response from the user to the pivot point that includes an indication of one of the nodes in the pivot point, such as the node for tickets 208. The data processing system can proceed down the tree levels to the child node 208. The data processing system can generate a second pivot point 214 for the child node 208 with grandchild node options "opera, musical, ballet, or sports". The grandchild nodes opera 216, musical 218, ballet 220, and sports 222 suggested in the pivot point 214 can relate to tickets node 208. If the user had selected the jewelry child node, the data processing system can generate a second pivot point 212 for the jewelry child node, with grandchild node options such as "necklace, bracelet, ring, or earrings". The grandchild nodes suggested in the pivot point 212 can relate to jewelry node 206.

The data processing system can receive a selection of the grandchild node sports 222. The data processing system can proceed to generate additional pivot points. For example, the data processing system can generate a third pivot point "basketball, football, or hockey" 224 that corresponds to the sports 222 node and tickets 208 node. In some cases, the data processing system can generate a checkpoint and suggest a final node, such as Lakers tickets 226 that corresponds to the basketball node within the pivot point 224.

If the user selects the final node 226, the data processing system can then perform an action, such as purchasing the tickets to a Lakers basketball game. The data processing system can generate or update a micro-profile for this context. The data processing system can identify the context as gift shopping, or gift shopping for mother in-law. The data processing system can further specify the context based on time year, holiday, location, etc.

Figure 3:
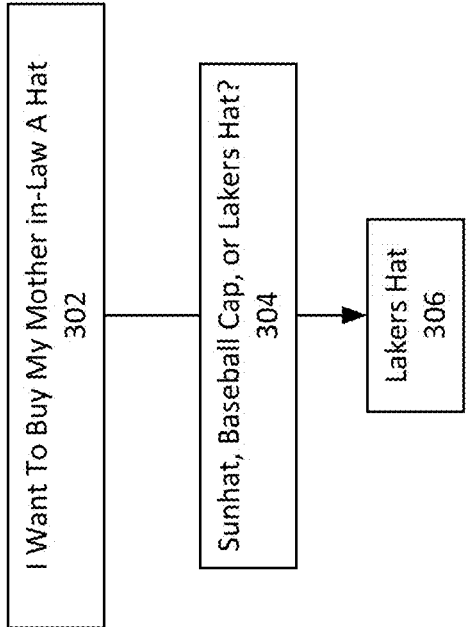
FIG. 3 is an illustration of an example query flow for dynamic tree structure generation, in accordance with implementations.

FIG. 3 is an ill is an illustration of an example query flow for dynamic tree structure generation, in accordance with implementations. The flow 300 can be performed by one or more system or component depicted in FIG. 1, including, for example, a data processing system. The data processing system can receive an original query or first query "I want to buy my mother in-law a hat" 302. This initial query can be more specific or less general than query 202. Accordingly, the data processing system can generate a new dynamic tree structure that skips one or more levels. In some cases, the data processing system can determine whether a micro-profile exists for this electronic account identifier and context. For example, the data processing system can perform a lookup in a micro-profile data structure. The data processing system can identify the micro-profile generated during flow 200 depicted in FIG. 2 for gift shopping. The data processing system can identify the final node 226 corresponding to Lakers tickets.

By loading the micro-profile, the data processing system can generate a first pivot point with child nodes "sunhat, baseball cap, or Lakers Hat" 304. As indicated in this first pivot point, the child nodes can be based on general related search results, as well as the specific final node Lakers tickets from the micro-profile. The user may select Lakers Hat as the final node 306. Thus, the query for buying mother in-law hat can be resolved with a single pivot point by loading a micro-profile generated for this user and context, thereby reducing computing resource utilizations and network transactions and duration of the communication session, while improving accuracy.

Figure 4:
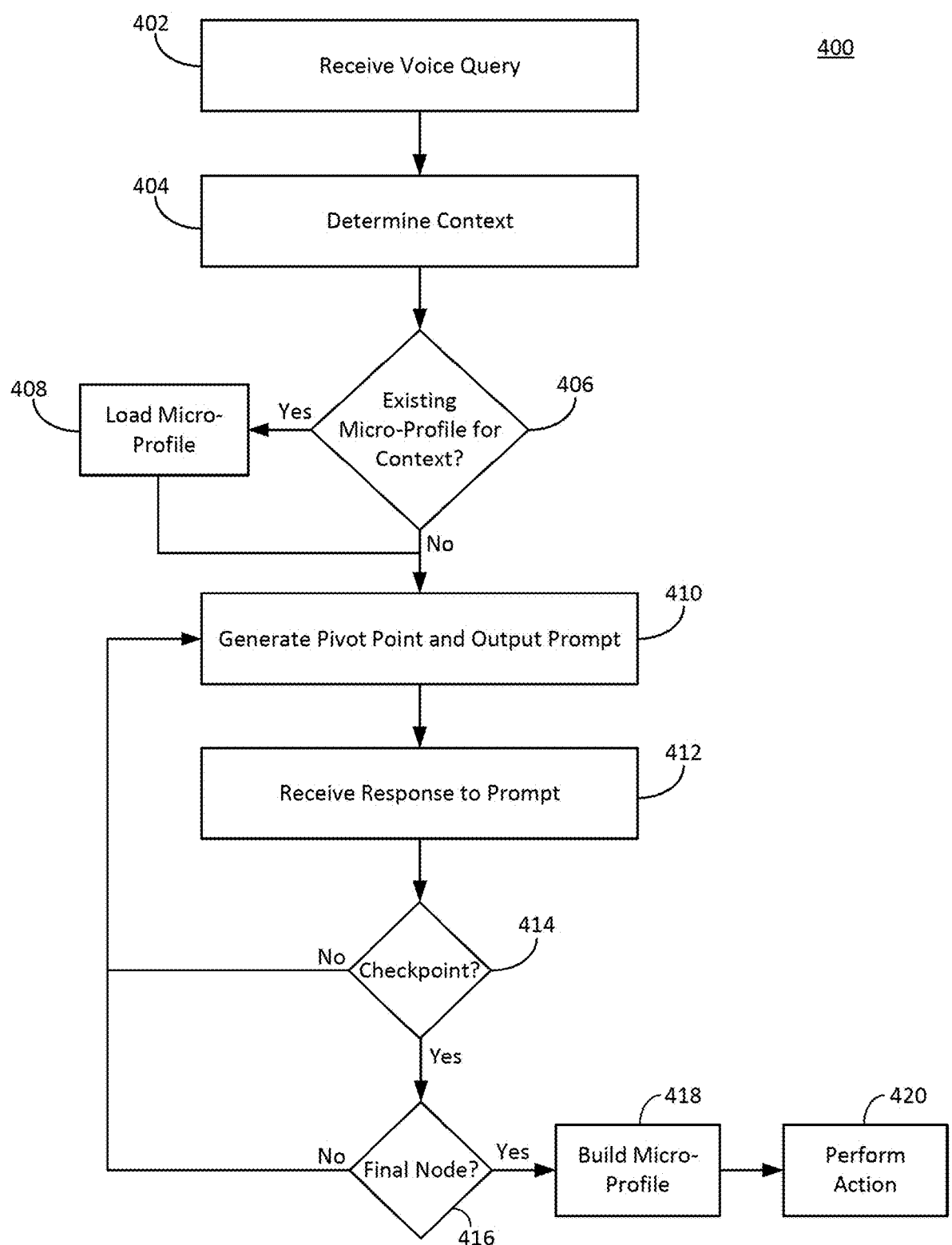
FIG. 4 is an illustration of an example method for dynamic tree structure generation, in accordance with implementations.

FIG. 4 is an illustration of an example method for dynamic tree structure generation, in accordance with implementations. The method 400 can be performed by one or more component or system or depicted in FIG. 1, including for example a data processing system. At 402, the data processing system can receive a voice query. The voice query can be an original or first voice query. The voice query can be general or have some level of specificity. At 404, the data processing system can determine a context associated with the voice query. The context can include time of day, time of year, semantic concept (gift shopping, travel, information request, movie request), language, acoustic characteristic of the voice input (e.g., mood, tone).

At 406, the data processing system can determine whether a micro-profile exists for the particular electronic account identifier associated with the device that detected the voice query. The data processing system can determine whether a micro-profile exists with a matching context. If a micro-profile exists for the user and context, the data processing system can load the micro-profile at 408 and then proceed to block 410. If a micro-profile does not exist for the user or with the same context, the data processing system can proceed directly to block 410 to generate a pivot point and output a prompt. The pivot point can be generated using a tree generator and based on related searches for similar users as well as a micro-profile, if it exists.

The data processing system can generate and output the pivot point, and then receive a response to the pivot point at 412. The response the pivot point can indicate a selection of a child node in the pivot point. The data processing system can proceed to decision block 414 to determine whether to generate a checkpoint. A checkpoint can refer to asking the user whether to continue in the tree process, or suggesting final node, or suggesting a more narrow pivot point in an effort to skip a level. The data processing system can determine whether to generate a checkpoint based on one or more factors, including, for example, the number of levels down from the top node the user is in the tree structure, the distance between disjointed sets in the previous pivot point or subsequent available pivot point, tone of the user's voice (e.g., frustrated with tree process), the duration of the communication session or since the original query was received by the data processing system. If the data processing system determines to not generate a checkpoint at 414, the data processing system can return to block 410 to generate a second pivot point and obtain another response to the second pivot point. The data processing system can iterate through the generation of pivot points and receiving selections of child nodes until the data processing system determines to generate a checkpoint.

If the data processing system determines to generate a checkpoint, the data processing system can proceed to decision block 416 to determine whether the user has reached a final node. For example, if the checkpoint question was "do you want to continue", and the user says "no", then the final node has been reached. If the user says they do want to continue with the tree generation, then the data processing system can determine the final node has not been reached, and then return to block 410 from decision block 416. In another example, the data processing system can output a final node suggestion, such as "Lakers ticket". At decision block 416, the data processing system can ask the user if this final result is acceptable. If the user indicates that this final node is satisfactory, then then data processing system can proceed to block 418.

At 418, the data processing system can generate, build, or update a micro-profile. The data processing system can build the micro-profile based on the keywords or interactions associated with generating the tree structure and reaching the final node. The data processing system can update a micro-profile if the data processing system had previously loaded a micro-profile with the same context. The data processing system can proceed to 420 to execute or perform an action associated with the final node, such as purchasing Lakers tickets, a Lakers hat, or performing any other action to order a product, service, or access requested information.

Figure 5:
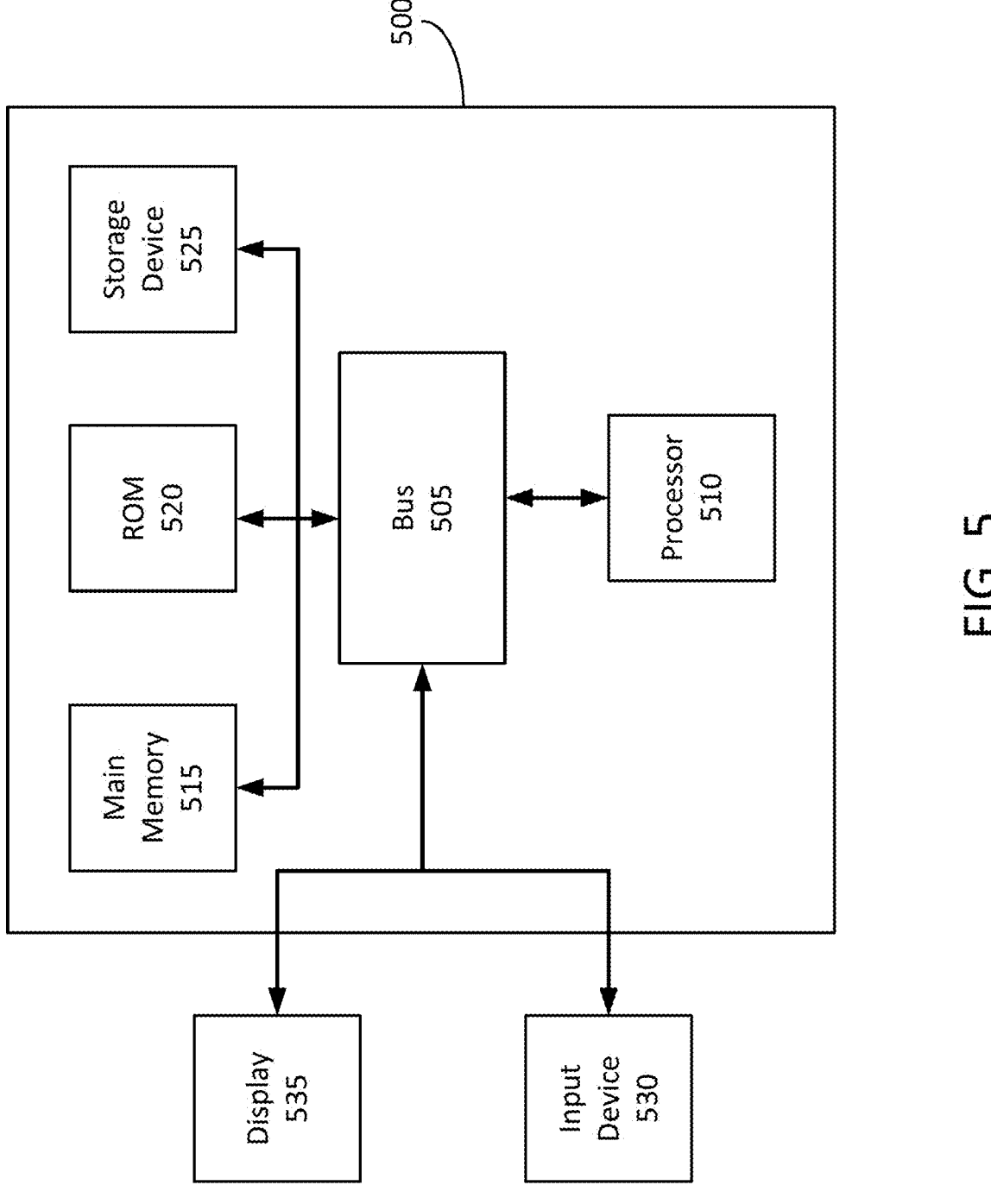
FIG. 5 is a block diagram illustrating an architecture for a computer system that can be employed to implement elements of the systems and methods described and illustrated herein, including, for example, the system depicted in FIG. 1, the query flows depicted in FIGS. 2 and 3, and the method depicted in FIG. 4.

FIG. 5 is a block diagram of an example computer system 500. The computer system or computing device 500 can include or be used to implement the system 100, or its components such as the data processing system 102, or client computing device 140. The data processing system 102 or client computing device 140 can include an intelligent personal assistant or voice-based digital assistant. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 118. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 425, such as a solid state device, magnetic disk or optical disk, can be coupled to the bus 505 to persistently store information and instructions. The storage device 425 can include or be part of the data repository 118.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102 or the client computing device 140 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 425. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the tree generator 112, digital assistant 108, checkpoint generator 114 or other components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 140 or the supplementary digital content provider device 130).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the natural language processor 106 and interface 104 can be a single component, app, or program, or a logic device having one or more processing circuits, or part of one or more servers of the data processing system 102.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for dynamic tree structure generation, comprising:
a data processing system comprising memory and one or more processors to:
receive a first query detected via a sensor associated with an electronic account identifier;
generate, from historical searches related to the first query executed by a plurality of computing devices, a first pivot point in a tree structure for the first query comprising a plurality of child nodes;
output a prompt to request selection of one of the plurality of child nodes;
receive, responsive to the prompt, an input comprising a selection of a first child node of the plurality of child nodes;
generate, from historical searches related to the first child node, a second pivot point in the tree structure comprising a plurality of grandchild nodes;
determine, based on a resource reduction policy, to generate a checkpoint to reduce additional child node generation; and
build, based on a response to the checkpoint, a microprofile for the electronic account identifier with the tree structure.

2. The system of claim 1, comprising:
the data processing system to generate the first pivot point with the first child node and a second child node, wherein the first child node and the second child node are separated by a distance greater than a threshold.

3. The system of claim 1, comprising:
the data processing system to generate the first pivot point with the first child node and a second child node, wherein a distance between the first child node and the second child node is a greatest distance among a plurality of candidate nodes identified responsive to the first query.

4. The system of claim 1, comprising:
the data processing system to generate the first pivot point with the first child node and a second child node, wherein the first child node and the second child node are formed from separate disjointed sets having sizes within a threshold size.

5. The system of claim 1, comprising the data processing system to:
output a second prompt to request selection of one of the plurality of grandchild nodes; and
skip, based on a response to the second prompt, a level in the tree structure to generate a third pivot point with a plurality of great-great-grandchild nodes.

6. The system of claim 1, comprising the data processing system to:
responsive to receipt of the first query, determine whether the micro-profile exists for the electronic account identifier; and
generate the first pivot point responsive to a determination that the micro-profile does not exist for the electronic account identifier.

7. The system of claim 1, comprising the data processing system to:
determine, responsive to receipt of the first query, a context associated with the electronic account identifier, the context based on at least one of a time of day, date, or an acoustic characteristic of the first query; and
associate the context with the tree structure in the micro-profile.

8. The system of claim 7, comprising the data processing system to:
receive a third query and determine a current context associated with the electronic account identifier;
determine the current context matches the context; and
load, responsive to the determination that the current context matches the context, the micro-profile to generate a second prompt responsive to the third query.

9. The system of claim 1, comprising:
the data processing system to erase the micro-profile from the data processing system responsive to termination of a session with the electronic account identifier.

10. The system of claim 1, comprising the data processing system to:
identify, based on the response to the checkpoint, a final node;
construct, based on the final node, an action; and
execute the action on a remote device configured to perform the action indicated in the final node.

11. The system of claim 1, comprising the data processing system to:
identify, based on the response to the checkpoint, a final node;
construct, based on the final node, an action to install an application on a computing device associated with the electronic account identifier; and
execute the action on the computing device to install the application.

12. A method for dynamic tree structure generation, comprising:
receiving, by a data processing system comprising memory and one or more processors, a first query detected via a sensor associated with an electronic account identifier;
generating, by the data processing system, from historical searches related to the first query executed by a plurality of computing devices, a first pivot point in a tree structure for the first query comprising a plurality of child nodes;
outputting, by the data processing system, a prompt to request selection of one of the plurality of child nodes;
receiving, by the data processing system responsive to the prompt, an input comprising a selection of a first child node of the plurality of child nodes;
generating, by the data processing system, from historical searches related to the first child node, a second pivot point in the tree structure comprising a plurality of grandchild nodes;
determining, by the data processing system based on a resource reduction policy, to generate a checkpoint to reduce additional child node generation; and
building, by the data processing system based on a response to the checkpoint, a micro-profile for the electronic account identifier with the tree structure.

13. The method of claim 12, comprising:
generating, by the data processing system, the first pivot point with the first child node and a second child node, wherein the first child node and the second child node are separated by a distance greater than a threshold.

14. The method of claim 12, comprising:
generating, by the data processing system, the first pivot point with the first child node and a second child node, wherein a distance between the first child node and the second child node is a greatest distance among a plurality of candidate nodes identified responsive to the first query.

15. The method of claim 12, comprising:
generating, by the data processing system, the first pivot point with the first child node and a second child node, wherein the first child node and the second child node are formed from separate disjointed sets having sizes within a threshold size.

16. The method of claim 12, comprising:
outputting, by the data processing system, a second prompt to request selection of one of the plurality of grandchild nodes; and
skipping, by the data processing system based on a response to the second prompt, a level in the tree structure to generate a third pivot point with a plurality of great-great-grandchild nodes.

17. The method of claim 12, comprising:
responsive to receipt of the first query, determining, by the data processing system, whether the micro-profile exists for the electronic account identifier; and
generating, by the data processing system, the first pivot point responsive to a determination that the micro-profile does not exist for the electronic account identifier.

18. The method claim 12, comprising:
determining, by the data processing system responsive to receipt of the first query, a context associated with the electronic account identifier, the context based on at least one of a time of day, date, or an acoustic characteristic of the first query; and associating, by the data processing system, the context with the tree structure in the micro-profile.

19. The method of claim 18, comprising:

receiving, by the data processing system, a third query and determine a current context associated with the electronic account identifier;

determining, by the data processing system, the current context matches the context; and loading, by the data processing system, responsive to the determination that the current context matches the context, the micro-profile to generate a second prompt responsive to the third query.

20. The method of claim 12, comprising:

identifying, by the data processing system based on the response to the checkpoint, a final node;

constructing, by the data processing system based on the final node, an action; and executing, by the data processing system, the action on a remote device configured to perform the action indicated in the final node.

* * * * *